United States Patent

Rice

[11] 4,011,857
[45] Mar. 15, 1977

[54] SOLAR ENERGY CONVERTER AND ELONGATED FRESNEL LENS ELEMENT

[76] Inventor: Harold D. Rice, 25th and McGee Trafficway, Kansas City, Mo. 64141

[22] Filed: Nov. 24, 1975

[21] Appl. No.: 634,763

[52] U.S. Cl. .............................. 126/270; 126/271; 350/211

[51] Int. Cl.² .......................................... F24J 3/02

[58] Field of Search ........... 126/270, 271; 237/1 A; 350/211

[56] References Cited

UNITED STATES PATENTS

| | | | |
|---|---|---|---|
| 937,013 | 10/1909 | Severy | 126/271 |
| 1,101,001 | 6/1914 | Willsie | 126/271 |
| 1,130,871 | 3/1915 | Willsie | 126/271 |
| 3,915,148 | 10/1975 | Fletcher et al. | 350/211 X |

Primary Examiner—Kenneth W. Sprague
Attorney, Agent, or Firm—Schmidt, Johnson, Hovey & Williams

[57] ABSTRACT

A solar energy concentrating and collecting assembly including a formed synthetic resin radiation concentrator having a series of elongated, generally rectilinear, side-by-side, parallel solar ray focusing surfaces that extend in a direction which is at an angle relative to the side margins of the focusing area but are of helical configuration longitudinally thereof in order to focus the solar radiation onto a narrow zone spaced from the concentrator which is parallel with the side margins of the focusing area. In its preferred form, the focusing surfaces define a Fresnel-type concentrator. A relatively large number of focusing surfaces are provided per unit width of the concentrator to minimize the effective thickness thereof and the accuracy and integrity of the focusing surfaces is obtained and preserved in the focusing unit by forming thereof from a sheet of synthetic resin material which has been forced against a cylindrical die having a continuous, helical, focusing surface defining groove in the circumference thereof which thereby causes such surfaces to be at an angle relative to the direction of travel of the sheet during forming and thereby in the final product, but with a built-in warp in such surfaces longitudinally thereof to maintain a nonangular focusing zone spaced from the concentrator. Forming of the concentrator against a continuous surface die permits fabrication of a radiation energy focusing sheet of any desired length having a series of repeat pattern Fresnel surfaces which merge smoothly and uninterruptedly one into another with the effective focus thereof extending longitudinally of the sheet even though the focusing surfaces are at an angle relative to the focus zone.

32 Claims, 14 Drawing Figures

SOLAR ENERGY CONVERTER AND ELONGATED FRESNEL LENS ELEMENT

This invention relates to solar energy conversion apparatus and particularly to an improved Fresnel-type radiation concentrator which is less expensive without loss of efficiency than units heretobefore available, while at the same time being readily adapted for use in a multitude of different applications.

Devices for converting solar radiation to other energy forms have been known and used since ancient times, but efficiency versus unit cost ratios have prevented widespread adoption and use of such equipment as either primary or alternate energy sources. Flat plate collectors, which may or may not have an energy-absorbing medium such as water running thereover, are the least expensive solar converters, but suffer from the disadvantage of low efficiency and the concomitant need for large surface areas exposed to the sun's rays. Efforts to decrease the overall size of the conversion units by use of radiation concentrating assemblies as component parts thereof have met with only limited success because of the disproportionate complexity and increase in cost relative to the decrease in size. One major factor inherently restricting utilization of solar collection apparatus as a substitute for other fuel sources has been the problem of storage of the energy collected for use either at a point remote from the radiation collecting device or at a time subsequent thereto. Flat plate collectors require a relatively large storage capacity because of the low temperatures involved in the conversion process. When water is used as the solar energy absorption medium, relatively large volumes of such water must be provided to act as a heat sink for storing the energy. This then necessitates utilization of large storage tanks and the like which are expensive in themselves and also require extensive insulation to preclude heat losses.

Solar energy conversion equipment which relies upon radiation concentrators to collect the sun's rays generate much higher temperatures than flat plate collectors and thus permit the utilization of smaller amounts of the storage medium to effect transmittal of energy from the collector to the point of use. However, as heretofore observed, radiation concentrating equipment is much more complex than flat plate devices, particularly in view of the fact that sun-tracking apparatus is preferably included in the overall package to maintain the concentrator in facing relationship to the radiation source, and efficient means must be provided for converting the sun's rays into a useful form of thermal energy, whether it be for heating or cooling purposes.

One of the problems which must be dealt with in fabricating solar converters of the radiant energy concentrating types is the need for incorporating sun-tracking mechanisms into the mechanical arrangement of the devices to keep the concentrator oriented with the sun. Since radiation focusing and concentrating structures heretofore available have been relatively heavy and of unwieldy size, tracking devices have of necessity involved equipment which was relatively uneconomic to install, not only from an operating point of view but also in terms of the energy needed to maintain proper functioning of the equipment over long time intervals. Units designed to act as an alternate or principal energy source must be substantially maintenance free for extended periods of time.

Many of the problems inherently associated with radiation conversion apparatus of the concentrating type have been overcome in the present invention by the provision of a lightweight radiation focusing sheet element which may be fabricated and placed in use at a much lower cost than heretofore possible and which allows the utilization of much less complex, lower cost and more maintenance free tracking equipment for maintaining the radiation concentrator in proper orientation relative to the sun's rays.

It is therefore a primary object of this invention to provide solar energy conversion apparatus including a unique radiation concentrator which has a series of radiation focusing surfaces extending at an angle to a longitudinal length of the concentrator but which are longitudinally warped in directions to cause the solar radiation to be focused onto an elongated zone extending along the axis of the concentrator sheet for heating an energy absorbing medium flowing through a conduit located at the focusing zone of the assembly. Angular disposition of the focusing surfaces relative to the axis of the sheet allows fabrication of a concentrator using a cylindrical drum having a continuous helical groove in the outer surface thereof configured and arranged to form the desired focusing pattern in the concentrator sheet as it is moved past the forming die.

It is a further important object of the invention to provide a solar converter as described wherein the cylindrical forming die has grooved surfaces therein which form a Fresnel-type focusing radiation concentrator with the Fresnel surfaces presenting a repeat pattern thereof along the longitudinal length of the sheet element. In this manner, the concentrator may be made of any desired length to fit a particular application while at the same time allowing disposition of the concentrators in any required orientation and disposition relatively.

A still further important object of the invention is to provide a solar converter and Fresnel-type concentrator wherein the thickness of the Fresnel unit may be minimized without sacrifice in the efficiency of the structure by virtue of the provision of a relatively large number of focusing surfaces per unit width of the concentrator with each surface in cross section representing a relatively accurate segment of which would otherwise be a thick semi-cylindrical lens of the same focal length.

A particularly important object of the invention is to provide a less costly method of producing elongated Fresnel-type solar radiation concentrators of any selected length by virtue of the fact that synthetic resin material of required width may be extruded from a conventional slit die and then passed between a grooved cylindrical forming die and a chilled backup cylinder. In this way, a radiation focusing sheet may be formed which continues in length so long as the resin is directed to the forming area. Of prime significance in this respect is the fact that the provision of a large number of focusing surfaces in the face of the sheet, formed therein by the cylindrical die, permits fabrication of a relatively thin radiation concentrator having the focal effect of a relatively wide and thereby normally thick lens element. As a consequence, there is not only a significant saving in the cost of the material required for fabrication of the unit, but the resulting radiation deflector is much simpler and easier to form than previously possible, using a minimum of construction personnel.

Also an important object of the invention is the way in which extrusion forming of the resin sheet followed by embossing thereof wich cylindrical grooved die allows exact reproduction of the focusing surfaces on a repetitive basis with little wear on the die by virtue of the fact that embossing takes place while the resin is in a semi-fluid or readily formable, somewhat plastic condition. This is extremely important when it is appreciated that all rounded as opposed to sharp cutoff angles and edges operate to reflect radiant energy and thereby contribute to loss of conversion efficiency.

Also an important aim of the invention is to provide an improved process for manufacturing solar radiation concentrating elements for solar energy converters permitting reproduction on an extremely accurate basis of a Fresnel-type radiation deflecting surface which would not be practical if a series of circumferentially extending, individual die grooves were provided in a die cylinder, but which becomes economically and technically feasible when the embossing cylinder employs a continuous, helically configured forming groove.

A further important object of the invention is to provide a Fresnel-type concentrator of indefinite length wherein any number of Fresnel focusing areas may be provided across the width of the sheet element for focusing of radiation onto a plurality of parallel zones spaced from the radiation concentrator, thus increasing the adaptability of the converter for different applications while still employing the same basic type of Fresnel forming equipment.

Other objects of the invention and advantages thereof will be explained or become obvious as the following specification progresses.

Figure 1:
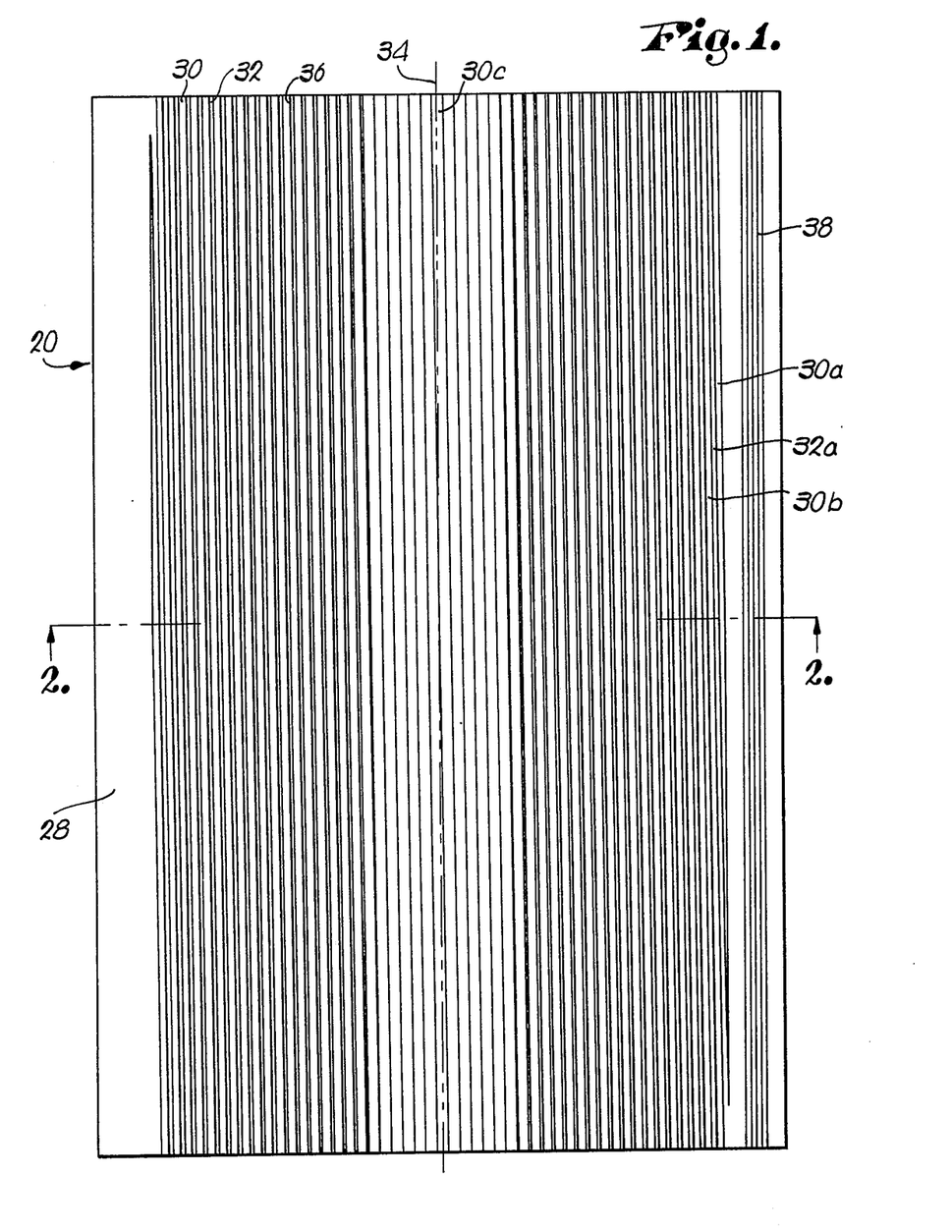
FIG. 1 is a plan view of a Fresnel-type solar radiation concentrator element constructed in accordance with the preferred concepts of the invention and thus provided with a series of slit guide tracks along one margin of the sheet, along with Fresnel radiation focusing surfaces at an angle relative to the guide tracks and thereby with respect to the longitudinal axis of the sheet.
Figure 2:
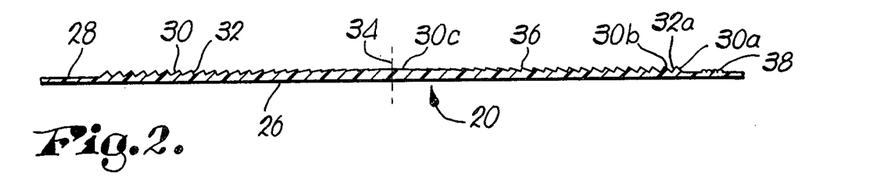
FIG. 2 is a vertical cross-sectional view taken substantially on the line 2—2 of FIG. 1.
Figure 3:
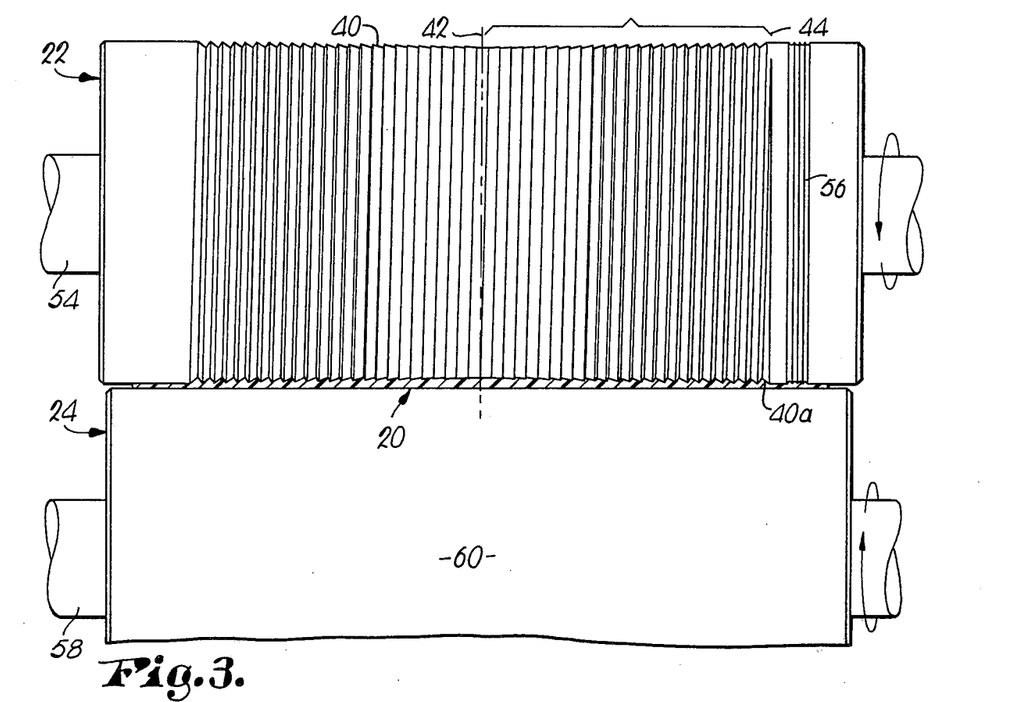
FIG. 3 is an essentially diagrammatic representation of a cylindrical forming die having a continuous helical groove in the periphery thereof configured to form the Fresnel radiation focusing surfaces in the sheet illustrated in FIGS. 1 and 2, along with a chilled backup cylinder rotatable adjacent the forming die.

The solar energy concentrator broadly designated by the numeral 20 in FIGS. 1 and 2 is preferably fabricated of synthetic resin material which is extruded in sheet form and then passed between a forming die 22 of cylindrical configuration as depicted in FIG. 3, backed up by a chill cylinder 24. The concentrator sheet 20 is illustrated as being of a length produced by one rotation of rotary die 22, although it is to be appreciated that the preferred process for producing concentrator 20 as described herein results in fabrication of a sheet radiation concentrator element of length limited only by supply of sheet material to the nip between forming die 22 and chill cylinder 24, with the Fresnel pattern depicted in FIG. 1 being repeated throughout the length of the elongated formed sheet.

As is well-known, a Fresnel radiation concentrator, whether it be of the diffraction or reflective type, has a series of focusing surfaces which represent segments of a spherical or semi-cylindrical lens member of equivalent length. In the case of an elongated radiation concentrator, the focusing surfaces comprise elongated segments which are projected from an imaginary semi-cylinder which passes through the side margins of the radiation diffractor or reflector. Although the individual focusing segments to be exactly representative of a semi-cylindrical lens should theoretically have curved outer faces, in practice, these surfaces can be transversely straight as tangents of such curves if the number of individual segments is sufficiently large to focus solar radiation passing therethrough or reflected therefrom to points very close to a line extending along the line represented by an infinite number of end-to-end focal points for the concentrator.

Since in the preferred converter of this invention the concentrator 20 has focusing surfaces of the order of 0.05 in. in width, the faces of the individual radiation focusing surfaces may be transversely flat as opposed to curved without significant sacrifice in the overall efficiency of the element. FIGS. 1 and 2 illustrate focusing surfaces twice as wide as actually contemplated for the commercial version of the concentrator 20 for purposes of clarity and to better illustrate the various angles of the radiation concentrating surfaces. It is to be understood in this respect that the invention is not limited to a specific number of focusing faces per unit width of the sheet member, but it is to be appreciated that for any given focal length, the fewer the number of solar ray diffracting or reflecting surfaces, the thicker the sheet must be. In the case of the preferred concentrator having a focal length of approximately 23 in. and focusing surfaces of the order of 0.05 in., the sheet element can have a thickness no less than about 0.07 in. As the number of reflecting or diffracting surfaces per unit width is decreased, the sheet thickness must also be increased, with an upper limit of about 0.125 in. being practical insofar as thickness is concerned when the source of the sheet material is a plastics extruder. In the case of thermoplastic sheets formed by other means, the thickness of the concentrator blank can be even greater. In large measure, the thickness dimension of the concentrator sheet is a function of the angle of the face between the outermost edge radiation deflecting surface and the next adjacent surface, and the greater the angle, the thicker the sheet blank must be to accommodate such angle.

As most evident from FIG. 2, the sheet 20, which is this instance is assumed to be of a transparent synthetic resin material such as a polycarbonate, has a flat face 26 and an opposed grooved side 28. A series of transversely inclined, longitudinally warped focusing surfaces 30 are joined by respective angular faces 32 which extend between adjacent margins of proximal surfaces 30. Viewing the righthand side of the concentrator 20 as shown in FIG. 2, it can be seen that the rightmost focusing surface 30a is at the greatest angle relative to flat face 26 and is joined to the next adjacent focusing surface 30b by inclined, elongated, longitudinally extending connector face 32a. The surfaces 30 successively decrease in relative angularity with respect to flat face 26 as the center line 34 of concentrator sheet 20 is approached by virtue of the fact that each of the surfaces 30 is configured to be parallel with a projection from corresponding tangents to a semi-cylinder whose end margins are located at the outermost side extremities of the grooved Fresnel defining pattern formed in the side 28 of sheet 20. Thus, the innermost surface 30c bisected by center line 34 is longitudinally warped as will be explained but is essentially flat at the center of the sheet in a longitudinal direction. It is also apparent from FIG. 2 that the groove defining surfaces and faces of concentrator sheet 20 are configured and arranged such that the peaks 36 presented by the zones of merger of respective faces 32 with surfaces 30 all lie in a common plane which is substantially parallel to the plane of flat face 26.

A series of elongated, transversely V-shaped slit guiding tracks or grooves 38 are also formed in the side 28 of sheet 20 to serve as a guide for a slitting mechanism to remove excess sheet material from opposed side edges of the Fresnel-defining pattern formed in grooved side 28 of the concentrator 20. The grooves or tracks 38 are parallel with center line 34 even though surfaces 30 and thereby faces 32 are at an angle with respect to such center line and the groove tracks, by virtue of formation of the Fresnel diffractor or reflector through utilization of a forming die such as the grooved cylinder 22 illustrated in FIG. 3. Tracks 38 also serve as means for orienting a slitter operable to cut the sheet 20 in a direction transversely thereof at and desired locations and to make certain that such cross cuts are in true perpendicular relationship to the center line 34.

In a conventional Fresnel lens, solar rays passing through the lens element are focused at a common point in predetermined spaced relationship from the lens which is a function of the curvature of the outer surface of the lens component. In the case of a cylinder type Fresnel lens, the light rays are focused onto a line spaced from and parallel with the axis of the semicylindrical lens. The manufacture of a relatively thin, elongated Fresnel reflector or diffractor presents substantially insurmountable problems when relatively narrow ray focusing surfaces are employed because of difficulties encountered in fabrication of the groove forming die for the radiant energy concentrator. This is true whether or not the means for embossing a synthetic resin sheet or equivalent component comprises a rotary embossing cylinder or a flat grooved die plate. Assuming for example that it is desired to fabricate a radiant energy concentrator having 400 ray focusing surfaces across a 20 in. span, it is to be appreciated that the accumulation of errors in any effort to mill such grooves into a cylindrical or flat die will produce such irregularities and inaccuracies in the dimensions of the grooves being formed as to make the resulting die of little practical utility in preparation of an efficient radiant energy concentrator. For example, if a 5 to 10 percent error occurs during adjustment of the machine to form the second groove in the die, this error will accumulate along with additional errors across the width of the die and very quickly render the entire tool worthless. Even sophisticated tape-controlled machines available to industry today are incapable of operating within limits that would prevent accumulation of error in the grooving process to an extent that the operator could be assured that each of the ray focusing surfaces is of the proper dimensions across the entire width of the sheet, which as indicated is preferably at least of the order of about 20 in. or the like. The problems referred to, though, are obviated when the forming die comprises a cylinder having a helical groove in the outer face thereof since any error in the initial setup simply continues without accumulating throughout the entire groove cutting process.

Figure 4:
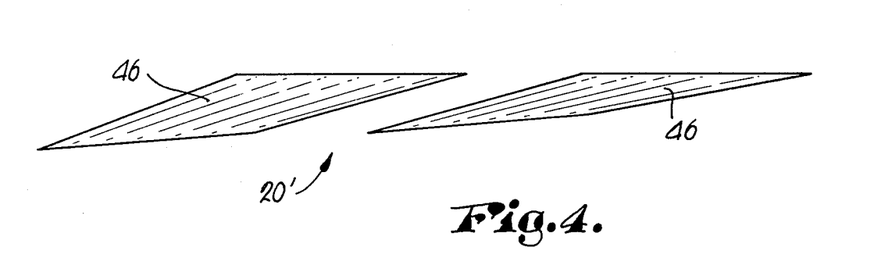
FIG. 4 is a diagrammatic perspective view of adjacent Fresnel radiation focusing surfaces viewed along the axis of a formed sheet, with the angles thereof being somewhat exaggerated and omitting the wall face of the sheet normally interconnecting such adjacent surfaces.
Figure 5:
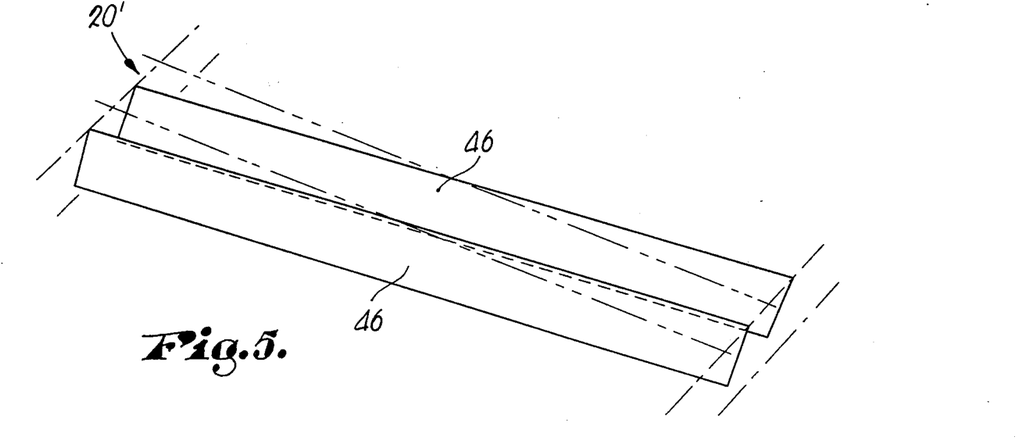
FIG. 5 is a diagrammatic perspective view of adjacent radiation focusing surfaces of the Fresnel sheet element as shown in FIGS. 1 and 2, illustrating the angular warp in adjacent surfaces, with the length thereof being shortened to more clearly delineate the longitudinal variation in the angularity of the surfaces.
Figure 6:
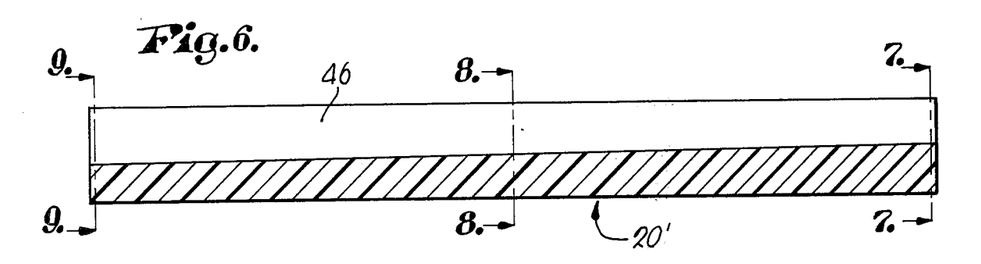
FIG. 6 is a longitudinal vertical sectional view through one of the radiation focusing surfaces of the solar energy concentrator to illustrate the variation in the angularity of such surfaces longitudinally thereof from one end of the sheet illustrated in FIGS. 1 and 2 to the opposite end thereof.
Figure 7:
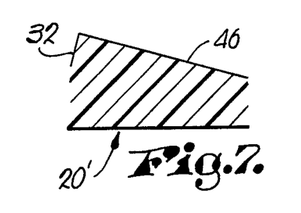
FIGS. 7, 8, and 9 are vertical cross-sectional views in diagrammatic form taken substantially along the lines 7—7, 8—8, and 9—9 respectively of FIG. 6.
Figure 8:
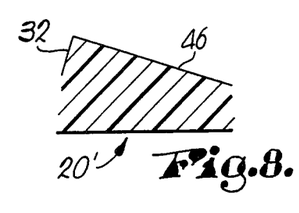
Figure 9:
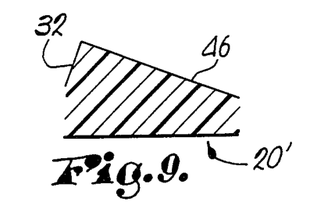
Figure 10:
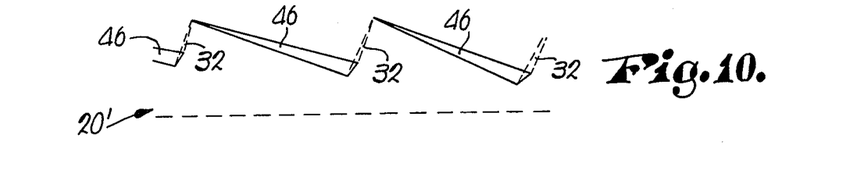
FIG. 10 is a diagrammatic representation of adjacent radiation focusing surfaces of the solar energy concentrator viewed along the length of such surfaces to illustrate the warp therein longitudinally of the sheet.

Although the helical lens forming groove in the cylindrical die 22 produces angular focusing surfaces in the side 28 of sheet 20 which are at an angle with respect to the center line 34 thereof, it has now been discovered that the groove defining faces in die 22 can be accurately configured and arranged to produce focusing surfaces 30 which are of longitudinally warped shape, which maintains the focal zone of the sheet along a center line parallel with the longitudinal axis of the sheet. As a consequence, during fabrication of die 22, the lens forming grooves therein can be machined in such a manner that considering any one point on the circumference of the die, the groove angle is constantly and uniformly changed so that it merges smoothly into the desired angularity of the next adjacent surface defining groove. If, for example, die 22 has a Fresnel forming continuous groove 40 therein across 20 in. of the face thereof and if such grooves form deflecting surfaces in sheet 20' of about 0.050 in. width, it can be appreciated that 200 of such groove segments will be provided between the center line 42 of die 22 and the end margins of the groove 40, as for example indicated by the number 44. With these hypothetical dimensions, the outermost groove wall 40a will be at an angle of about 40° and continuously decreases toward the center line 42 through a variation of about 0° 12' for each 360° extent thereof around the circumference of die 22. This 12 minute slope is illustrated diagrammatically in FIGS. 4 – 9 inclusive, where it is to be seen from FIG. 6 that a representative focusing surface of the sheet 20' formed between die 22 and backup cylinder 24 has an inclined radiation deflecting face 46 which continuously changes in slope from one end of sheet 20' toward the opposite end thereof. Variation in slope of wall surfaces 46 is further illustrated in FIGS. 4, 5 and 10. Inclined faces 32 interconnecting adjacent spaced edge margins of proximal inclined radiation deflecting surfaces 46 are also longitudinally warped as is evident from FIG. 10.

Figure 11:
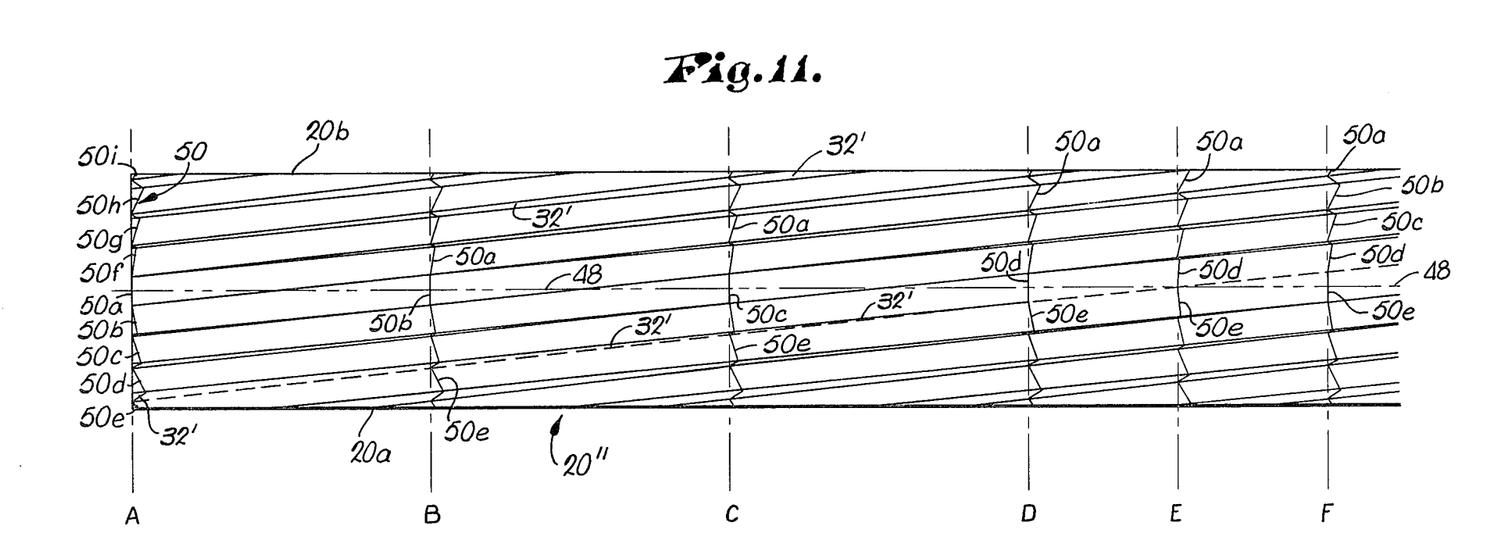
FIG. 11 is a diagrammatic representation on an enlarged, exaggerated scale illustrating the way in which fabrication of the Fresnel-type radiation concentrator using a cylindrical forming die wherein the grooves defining the focusing surfaces are in a helical pattern around the cylinder to produce a repeat pattern of Fresnel surfaces on a flat sheet, with such surfaces warped in a manner to maintain the focal point along the center line of the sheet.
Figure 12:
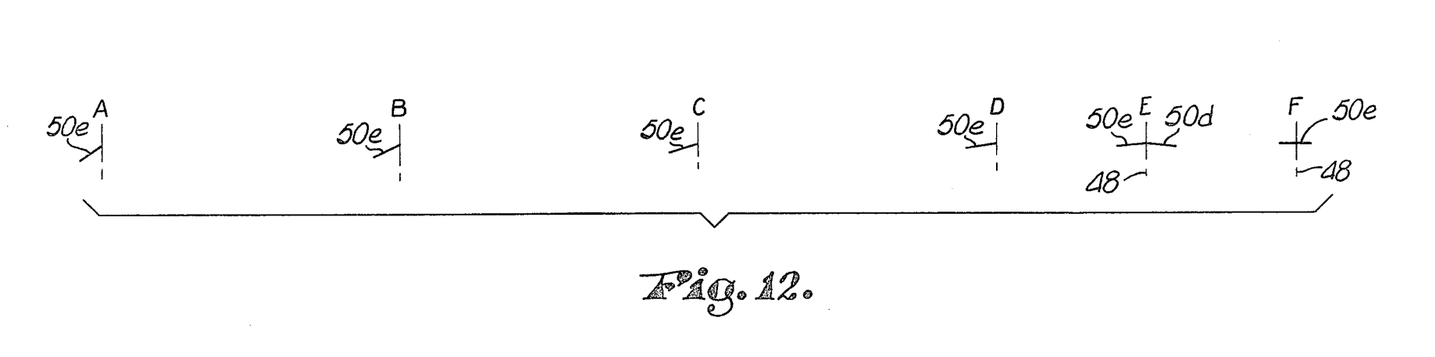
FIG. 12 is a schematic representation of the angle of the bottommost focusing surface commencing at the line A of FIG. 11 and illustrating the angularity of such surface at the lines B, C, D and F upon rotation of the forming die through four complete revolutions.

The relative orientation and shape of the ray deflecting surfaces formed in a concentrator sheet 20 may be better understood by reference to the diagrammatic representations of FIGS. 11 and 12, with FIG. 11 showing a sheet 20" wherein the radiation deflecting Fresnel-type grooves are longitudinally warped in order to maintain the zone of focus of the sheet along center line 48 even though such surfaces are at an angle relative to such line. For simplicity of illustration, the sheet 20" is shown as having only eight ray deflecting surfaces, although it is to be understood that the principles detailed with respect to sheet 20' apply to a concentrator having a much larger number of deflecting surfaces, as for example the preferred sheet having 400 angular surfaces of equal width across a panel 20 in. wide. It is to be emphasized in this respect that the concepts of this improvement are applicable to a sheet of any desired width, subject only to proper structural support therefor, and one of the advantages of the invention is the fact that a relatively wide concentrator sheet may be fabricated in accordance with the precepts hereof. The only requirement is that an accurate and precise helical groove be formed in the circumferentially extending surface of die 22 for embossing the sheet material forced thereagainst.

Again referring to FIG. 11, the reference line A across sheet 20" represents the commencement of one Fresnel repeat pattern, with the transverse configuration thereof at such line being indicated by the irregular schematic cross sectional line 50. The radiation deflecting surface 50a which is innermost along line A is essentially flat along line A and thereby oriented in perpendicular relationship to the sun's rays at such point. However, since the angularity of surface 50a increases as the next repeat pattern line B is approached, the zone of focus of surface 50a remains in longitudinal alignment with center line 48, as is evident from the schematic cross sectional representation at that point. In a similar manner, surfaces 50b to e inclusive decrease in angularity as they progress toward line 48, while surfaces 50f to i inclusive gradually and continuously increase in angularity in a direction away from line 48. In view of the fact that the Fresnel pattern is formed in sheet 20" by a helical groove, the angular surfaces which in effect "run off" the side margin 20b commence again at margin 20a alignment with the run off point and of the same angularity but in the opposite direction. It is also to be observed from FIG. 11 that the surface 50b is essentially flat at repeat line B; the same is true as to surface 50c at line C, surface 50d at line D and surface 50e at line F. Transverse reference line E illustrates the fact that halfway between repeat reference lines D and F, the surfaces 50e and 50d are inclined in opposite directions but at the same angle. Of particular significance is the fact that although the deflecting surfaces are on a bias longitudinally of the sheet, the effective focusing points thereof are aligned in parallel relationship to center line 48. It is also apparent from FIG. 11 that the Fresnel pattern formed in sheet 20" may be continued indefinitely with the center of focus of deflecting surfaces 50 along center line 48 notwithstanding the longitudinal angularity of such surfaces.

It has also been discovered that by the use of a thermoplastic synthetic resin material for producing concentrator sheet 20 and to fabricate such element between die 22 and chill cylinder 24, the plastic material is capable of displacing transversely to an extent necessary to provide compensation for the variable width of the wall faces 32 which join adjacent deflector surfaces 30 of the sheet 20 along the length of the radiation concentrator. Referring to FIG. 11, it can be seen that the effective width of wall faces 32' gradually decreases to zero at center line 48 and then to the same degree increases on the opposite side of the center line. Since the die 22 and sheet 20 passed thereunder do not move relatively, it is to be recognized that the lateral displacement of individual portions of the embossed section of the synthetic resin which occurs during forming of the Fresnel pattern also provides required compensation for the double warp involved in the radiation displacement surfaces of the concentration as well as in the wall faces joining adjacent edges thereof.

The cylindrical die 22 is preferably constructed of a wear-resistant metal and mounted for rotation about a fixed horizontal axis through the support shaft means 54. In addition to the helical groove 40 in the outer face thereof, the surface of die 22 has a series of circumferentially extending grooves 56 therein coaxial with shaft means 54 located in disposition to form the guide tracks 38 in formed sheet 20. Backup cylinder 24, also preferably fabricated of wear-resistant metal, has a smooth outer face and rotates in the opposite direction from die 22 about shaft means 58 which turns about an axis parallel with the axis of shaft means 54. If desired, cylinder 24 may be of hollow chamber configuration to permit a cooling fluid such as water to be introduced into the interior thereof on a continuous basis to chill the outer cylindrical surface 60 of the backup member. In this manner, the Fresnel pattern embossed in sheet 20 may be immediately set in the thermoplastic material as the latter emerges from the space between the grooved surface of die 22 and cylindrical surface 60. For illustrative purposes only and not as a limitation on the scope of this invention, forming die 22 may be of a circumference to provide a Fresnel pattern which repeats every 36 in. when a 20 in. wide concentrator is being fabricated having individual radiation deflecting surfaces of the order of 0.050 in. wide.

Figures 13, 14:
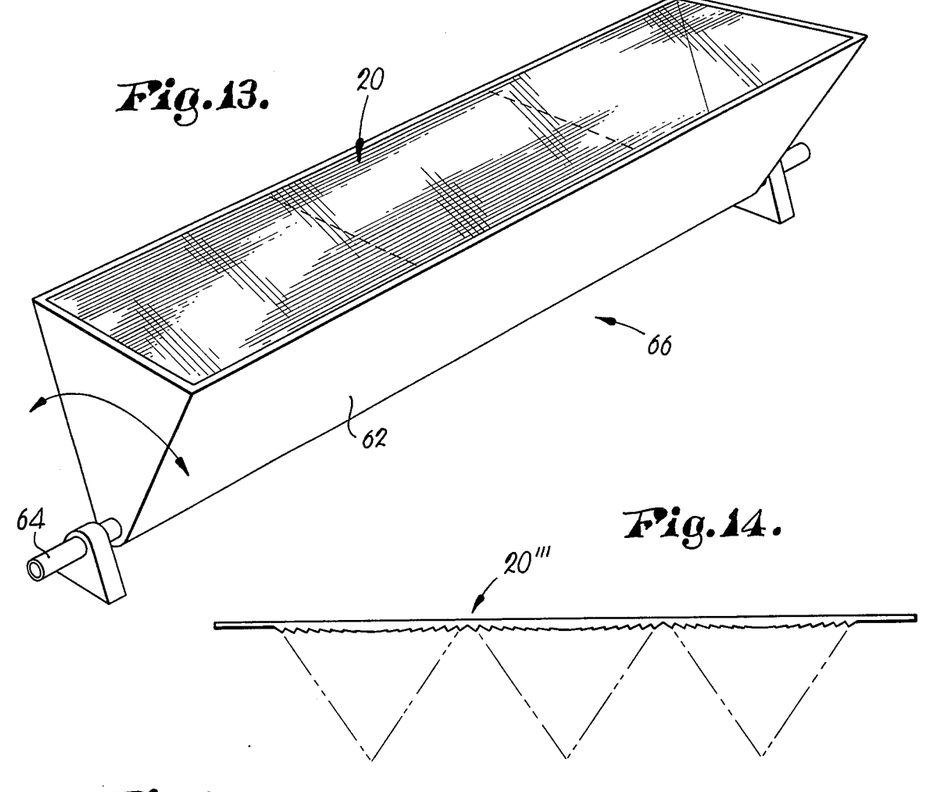
FIG. 13 is a schematic perspective representation of a solar energy converter embodying the preferred Fresnel solar radiation concentrator of this invention with a conduit for conveying an energy absorbing medium through the radiation focus zone illustrated as being located at the axis of swinging movement of the converter whereby the latter may be maintained in direct facing relationship to the sun.
FIG. 14 is a vertical cross-sectional schematic view of another type of radiation concentrator made in accordance with this invention provided with a plurality of Fresnel focusing areas thereon which direct solar radiation onto respective focal points, thus shortening the overall distance between the radiation concentrator and a collection point therebelow, which has advantage in certain applications of limited usable space.

A typical use for concentrator screen 20 is illustrated in FIG. 13 wherein it can be seen that the converter 66 has a transparent formed sheet 20 which is carried by an elongated, transversely V-shaped housing 62 provided with an elongated conduit 64 extending therethrough adjacent the apex of the V unit. Conduit 64 is adapted to convey a radiant energy absorbing medium such as water through housing 62 to and from a point of use. The dimensions of the housing 62, as well as the location of pipe or conduit 64 relative thereto, are chosen to place the longitudinal axis of the conduit substantially at the zone of focus of concentrator sheet 20. At least the part of conduit 64 within housing 62 is preferably coated black to enhance absorption of radiant energy by the water or other energy absorbing medium flowing therethrough, and in addition, means (not shown) is preferably coupled to the housing 62 for swinging the latter about the axis of conduit 64 to maintain the face of formed sheet 20 in perpendicular relationship to the sun's rays by tracking the movement thereof relative to the position of solar energy converter 66. If desired and for maximum efficiency, means (not shown) may also be employed for shifting the overall location of the converter 66 to compensate for the seasonal azimuth of the sun relative to the horizon at a particular time of day. The schematic converter 66 shown in FIG. 13 is illustrated as having three repeat pattern Fresnel radiation deflector sections making up the concentrator screen, but it is to be understood that the length of the formed sheet is dependent only upon the physical requirements of a particular location. In addition, the concentrator may be made up of a series of individual diffractors located in end-to-end relationship rather than being integrally interconnected as depicted. One of the important features of the invention, however, is the fact that the extrusion and forming process preferred for fabrication of radiation concentrating sheet 20 allows manufacture of formed sheets of any desired length, which, for example, may be as long as 100 ft. or more. This permits mounting of the converter 66 along the edge of a building, for example, in conforming relationship to the margin thereof so that the aesthetics of the building structure are not detrimentally affected.

Although not detailed in the drawings, it is to be appreciated that structure may be provided on housing 62 in underlying relationship to the concentrator sheet to provide support therefor and maintain the parallelism of the faces of the same. This support may take the form of an egg crate type of lattice member, with those segments parallel with the longitudinal center line of the sheet inclined inwardly in parallel relationship to respective angles of deflection of the radiant energy toward conduit 62.

In addition, the utilization of a Fresnel pattern in the formed sheet 20 allows the flat face 26 thereof to be located upwardly if desired for minimization of collection of dirt particles or the like thereon which would decrease the efficiency of the converter and require more frequent cleaning of the surface facing the sun. Upward disposition of the flat face also allows fabrication of a concentrator sheet with deflector surfaces formed to focus the sun's rays with only one angle of incidence, whereas upward disposition of the grooved face necessitates compensation for two angles of diffraction. In the alternative a protective flat transparent sheet member may be placed over an upwardly facing grooved surface concentrator if desired.

Although the converter 66 having a diffraction screen or Fresnel-type concentrator as an operative component thereof is the preferred embodiment of the present invention, it is to be understood that a reflector-type lens may be used in place of screen 20, with means being provided to form a mirror face on the grooved surface of the formed sheet to focus radiant energy on a conduit again located at the focal zone of the reflector. Vacuum metalizing techniques make such mirror application practical at a reasonable cost.

The formed radiation concentrator 20''' illustrated in FIG. 14 shows three side-by-side Fresnel-type ray deflecting screens across the width of the sheet and extending longitudinally of the latter. In this case, a conduit would be located at the focal zone of each Fresnel-type lens section and in parallel relationship longitudinally of the converter. Here again, the number of Fresnel-type radiant energy concentrating sections across the width of sheet 20''' may be varied as desired, but advantages derived from the shortened focal length must be compared and correlated with the somewhat increased costs inherent in the use of a larger number of energy collecting conduits. Overall efficiency must therefore be determined to fabricate the most advantageous installation for the particular site of use.

Having thus described the invention, what is claimed as new and desired to be secured by Letters Patent is:

1. A solar radiation concentrator comprising:
    a sheet element having a series of elongated, generally straight, side-by-side, essentially parallel, radiation focusing surfaces conjointly presenting a solar radiation focusing area,
    said surfaces being of transversely angular configurations relative to one another, causing solar rays impinging on said area to be focused by the surfaces onto an elongated zone spaced from the area of narrower width than the latter to concentrate the radiation in said zone,
    each of said surfaces having an angularity at one end thereof which is different from the angularity of such surface at the opposite end of the same, whereby the zone of focus is oriented with the longitudinal axis thereof at an angle relative to the longitudinal lengths of said surfaces.

2. A solar radiation concentrator as set forth in claim 1 wherein each of said surfaces is configured to present a continuously changing angularity transversely thereof from one end to the opposite end of the same.

3. A solar radiation concentrator as set forth in claim 1 wherein said surfaces are configured and arranged to present a Fresnel-type focusing area.

4. A solar radiation concentrator as set forth in claim 1 wherein said sheet element is of transparent material and each of the surfaces defines one side of a diffraction lens component.

5. A solar radiation concentrator as set forth in claim 1 wherein each of said surfaces represents in cross section a projection to a common planar area of a respective tangent to corresponding curve segments that lie in an imaginary cylinder extending through opposite side margins of the focusing area.

6. A solar radiation concentrator as set forth in claim 5 wherein each of said surfaces is joined to an adjacent surface by an inclined face, said faces decreasing in inclination and being of less width as the center portion of the area is approached:

7. A solar radiation concentrator as set forth in claim 1 wherein said surfaces of the element are inclined relatively in opposite directions from respective side margins of the area as the central part of the element is approached.

8. A solar radiation concentrator as set forth in claim 1 wherein said element is of generally planar overall configuration with the outermost peak defining edge of each of said surfaces remote from the main body of the element essentially lying in a common plane.

9. A solar radiation concentrator comprising:
a sheet element having a series of elongated, generally straight side-by-side, essentially parallel, radiation focusing surfaces conjointly presenting a solar radiation focusing area,
said surfaces being of transversely angular configurations relative to one another, causing solar rays impinging on said area to be focused by the surfaces onto an elongated zone spaced from the area of narrower width than the latter to concentrate the radiation in said zone,
each of said surfaces being longitudinally warped in a direction and to an extent to cause the angle of a respective surface at one end thereof to be essentially the same as the angle of the surface at the opposite end of a next adjacent surface.

10. A solar radiation concentrator as set forth in claim 9 wherein each of said surfaces is of generally helical configuration longitudinally thereof.

11. A solar radiation concentrator as set forth in 'm 9 wherein the change in angularity of each of the ces is relatively uniform throughout respective thereof.

A solar radiation concentrator as set forth in 9 wherein said surfaces define a Fresnel-type focusing area.

13. A solar radiation concentrator as set forth in claim 9 wherein said element has opposed, generally parallel, side margins, the longitudinal lengths of said surfaces being at an angle relative to said side margins.

14. A solar radiation concentrator as set forth in claim 9 wherein said element is of relatively thin, transparent synthetic resin material.

15. A solar radiation concentrator as set forth in claim 9 wherein said element comprises a blank having at least one elongated slit guide track therein, said surfaces being oriented at an angle relative to said guide track.

16. A solar radiation concentrator as set forth in claim 9 wherein said element is provided with a plurality of surfaces defining separate side-by-side Fresnel-type focusing areas each adapted to direct solar rays onto a respective zone aligned therewith whereby said zones are in spaced, generally parallel relationship.

17. A solar radiation concentrator comprising:
an elongated sheet element having a plurality of end-to-end repeat pattern radiation focusing areas, each of said areas being provided with a series of elongated, generally straight, essentially parallel solar ray focusing surfaces, each of said surfaces being aligned with and merging into a surface of a next adjacent focusing area,
said surfaces being of transversely angular configuration relative to one another, causing solar rays impinging on respective areas to be focused by such surfaces onto a zone spaced from a corresponding area and of narrower width than the latter to concentrate the radiation in each of said zones,
said surfaces extending in directions which are at an angle relative to the longitudinal length of the sheet element and longitudinally warped to an extent and in directions to cause the solar rays to be focused onto said zones and which extend longitudinally of the element in substantially parallel relationship to the longitudinal axis thereof notwithstanding the angular disposition of the surfaces relative to said axis.

18. A solar radiation concentrator as set forth in claim 17 wherein the angle of inclination of each of said surfaces changes from one relative direction to an opposite direction intermediate the ends thereof.

19. A solar radiation concentrator as set forth in claim 17 wherein said surfaces present Fresnel-type radiation focusing areas.

20. A solar radiation collecting assembly comprising:
an elongated sheet element having a plurality of end-to-end repeat pattern radiation focusing areas, each of said areas being provided with a series of elongated, generally straight, essentially parallel solar ray focusing surfaces, each of said surfaces being aligned with and merging into a surface of a next adjacent focusing area,
said surfaces being of transversely angular configurations relative to one another, causing solar rays impinging on respective areas to be focused by said surfaces thereof onto a relatively narrow zone spaced from a corresponding area to concentrate the radiation in each of said zones,
said surfaces extending in directions which are at an angle relative to the longitudinal length of the sheet element and longitudinally warped to an extent and in directions to cause the solar rays to be focused onto said zones and which extend longitudinally of the element in substantially parallel relationship to the longitudinal axis thereof notwithstanding the angular disposition of the surfaces relative to said axis;
an elongated collector conduit having a solar radiation absorption surface and adapted to convey a thermal energy absorbing medium therethrough; and
means mounting the conduit in disposition aligned with said zones, and conduit being of a width approximately equal to that of said zones for most efficient collection of solar radiation impinging thereon.

21. A solar radiation collecting assembly as set forth in claim 20 wherein said surfaces of the element are configured and arranged to define a series of Fresnel-type focusing areas.

22. A solar radiation collecting assembly as set forth in claim 20 wherein said surfaces of each element face toward the conduit and thus away from the radiation source.

23. A solar radiation collecting assembly as set forth in claim 20 wherein is provided means mounting the elements for swinging movement through an arc which will maintain the same in essentially perpendicular relationship to the source of said solar radiation.

24. A solar radiation collecting assembly comprising:
a plurality of sheet element concentrators disposed in end-to-end relationship and each having a series of elongated, generally rectilinear, side-by-side, essentially parallel radiation focusing surfaces conjointly presenting a solar radiation focusing area,
said surface of each element being of transversely angular configuration relative to one another, causing solar rays impinging on a respective area to be focused by the surfaces thereof onto an elongated zone spaced therefrom of narrower width than the corresponding area to concentrate the radiation in the zone associated with each element, said elements being oriented with the surfaces thereof extending in essentially the same direction and the surfaces thereof being configured and arranged to focus solar radiation onto zones which are essentially aligned end-to-end;

an elongated collector conduit having a solar radiation absorptive surface and adapted to convey a thermal energy absorbing medium therethrough; and means mounting the conduit in the aligned zones in disposition extending longitudinally thereof, each of said surfaces of each element being longitudinally warped in a direction and to an extent to cause the angle of a respective surface at one end thereof to be essentially the same as the angle of the surface at the opposite end of a next adjacent surface.

25. A solar radiation collecting assembly comprising:

a sheet element having a series of elongated, generally rectilinear, discrete, essentially parallel, radiation focusing surfaces on one face thereof conjointly presenting a solar radiation focusing area, the opposite of said element being substantially planar and parallel with an imaginary plane through the outermost projections of the focusing surfaces defining said area, said surfaces being of transversely angular configurations relative to one another, causing solar rays impinging on said area to be focused by the surfaces onto a relatively narrow, elongated zone spaced from the area, each of said surfaces being of longitudinally helical configuration whereby the angularity thereof constantly changes from one end of a respective surface to the opposite end of the same;

an elongated collector conduit having a solar radiation absorptive surface and adapted to convey a thermal energy absorbing medium therethrough; and means mounting the conduit in said zone in disposition extending longitudinally thereof.

26. A solar radiation collecting assembly as set forth in claim 25 wherein said mounting means supports the conduit with the axis thereof substantially along a line representing the focal points of said surfaces along the longitudinal lengths thereof.

27. A solar radiation collecting assembly as set forth in claim 26 wherein said surfaces define a Fresnel-type focusing area.

28. A solar radiation collecting assembly as set forth in claim 27 wherein said planar face of the element is oriented in disposition facing away from said conduit.

29. A solar radiation collecting assembly as set forth in claim 25 wherein said element comprises transparent polycarbonate type synthetic resin material.

30. A solar radiation collecting assembly as set forth in claim 25 wherein from 5 to 25 of said surfaces are provided in said one face of the element per inch of width transversely thereof.

31. A solar radiation collecting assembly as set forth in claim 30 wherein about 20 of said surfaces are provided in said face per inch of width thereof.

32. A solar radiation collecting assembly as set forth in claim 25 wherein one face of the element is provided with a plurality of said focusing areas in side-by-side relationship, each of which defines a Fresnel-type radiation concentrator, there being a conduit aligned with and receiving solar radiation from each Fresnel-type concentrator respectively.

* * * * *